UNITED STATES PATENT OFFICE.

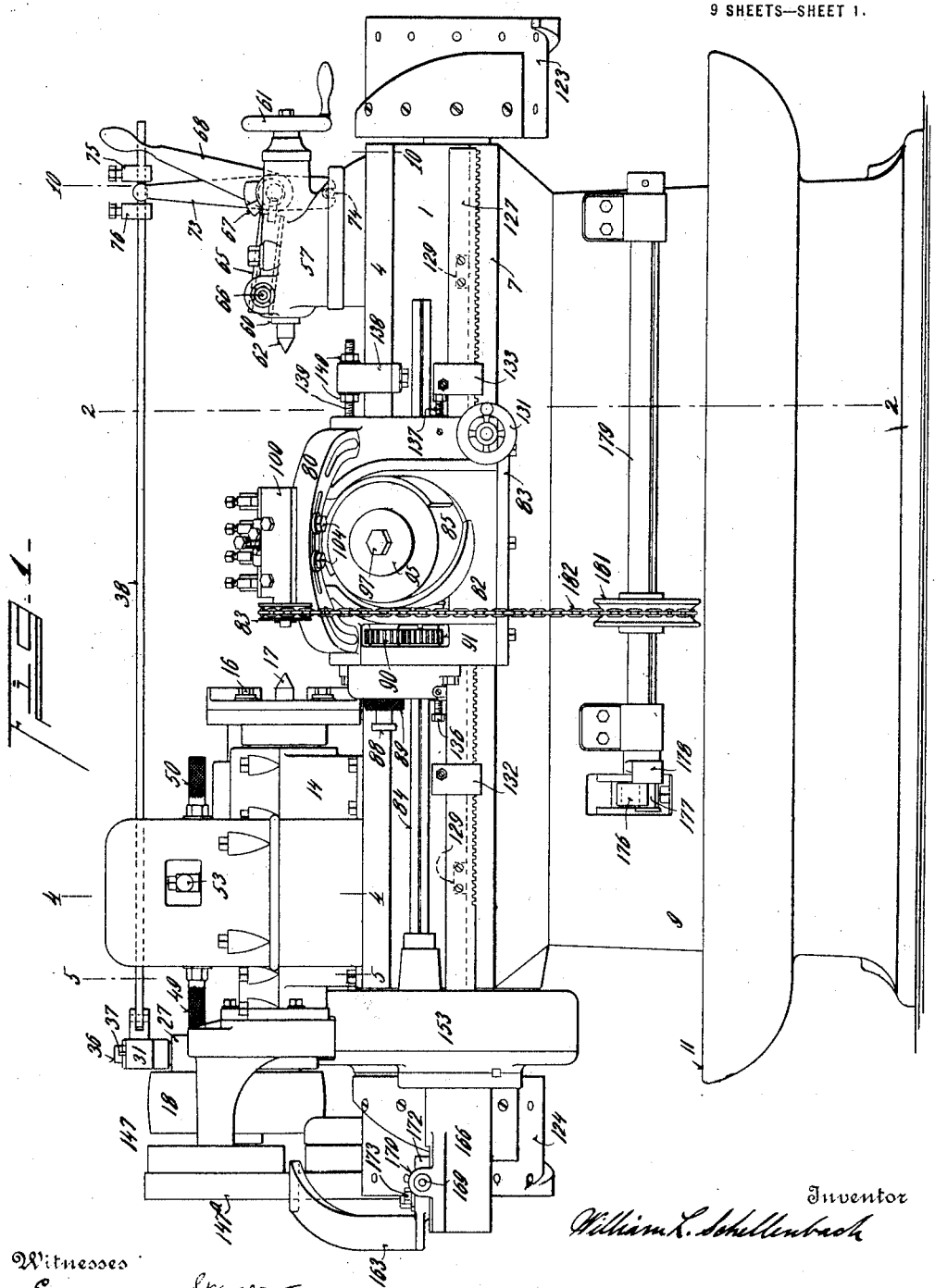

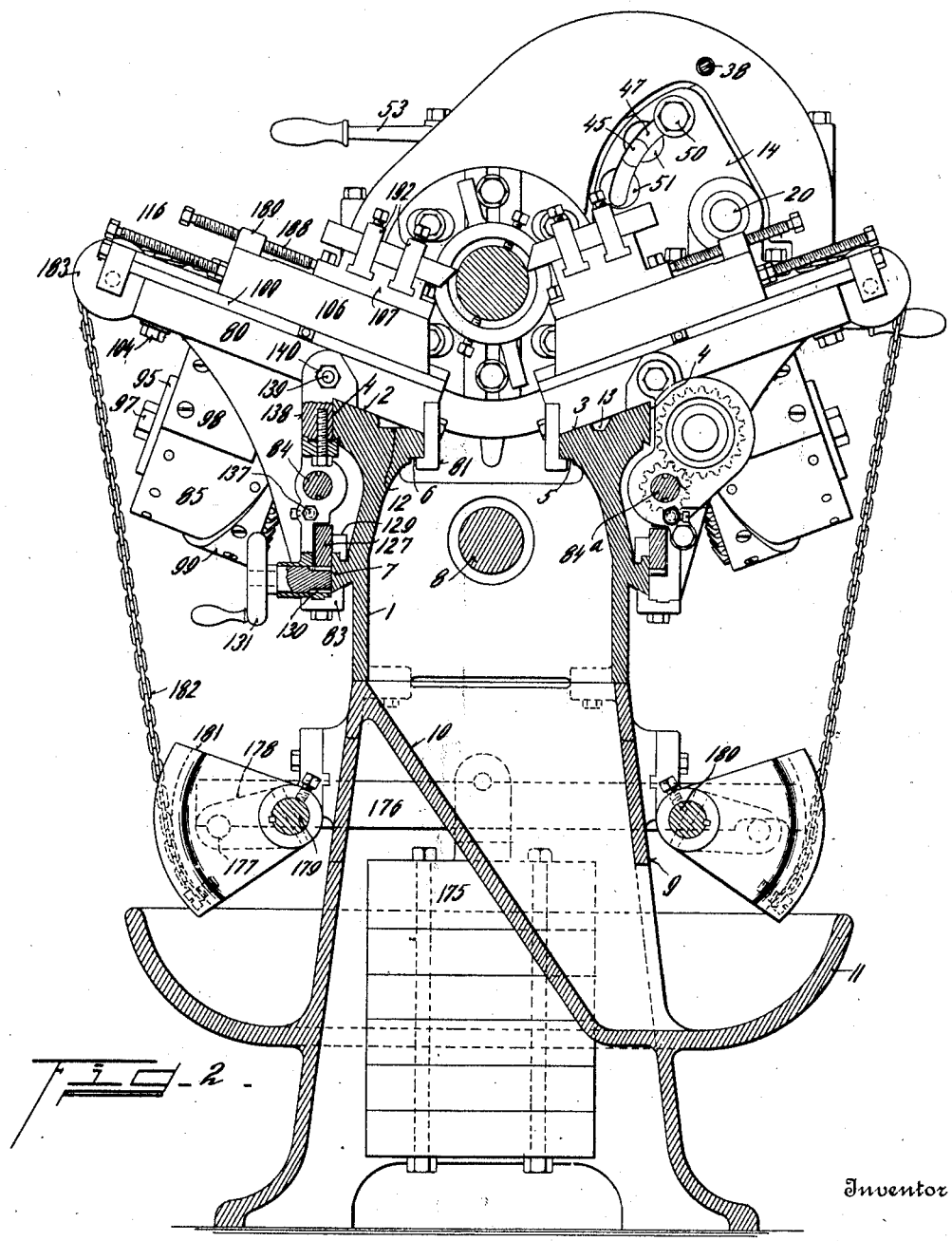

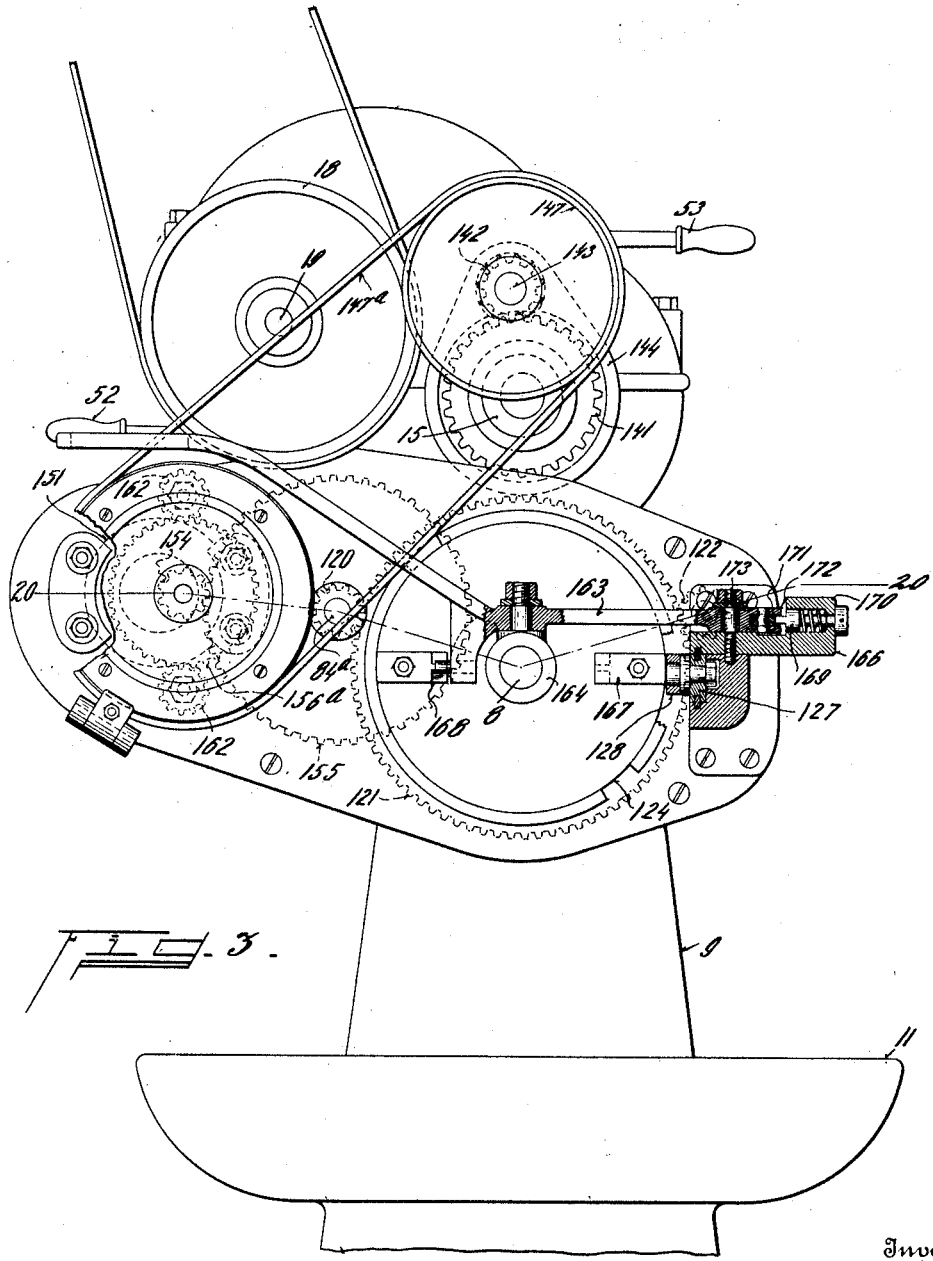

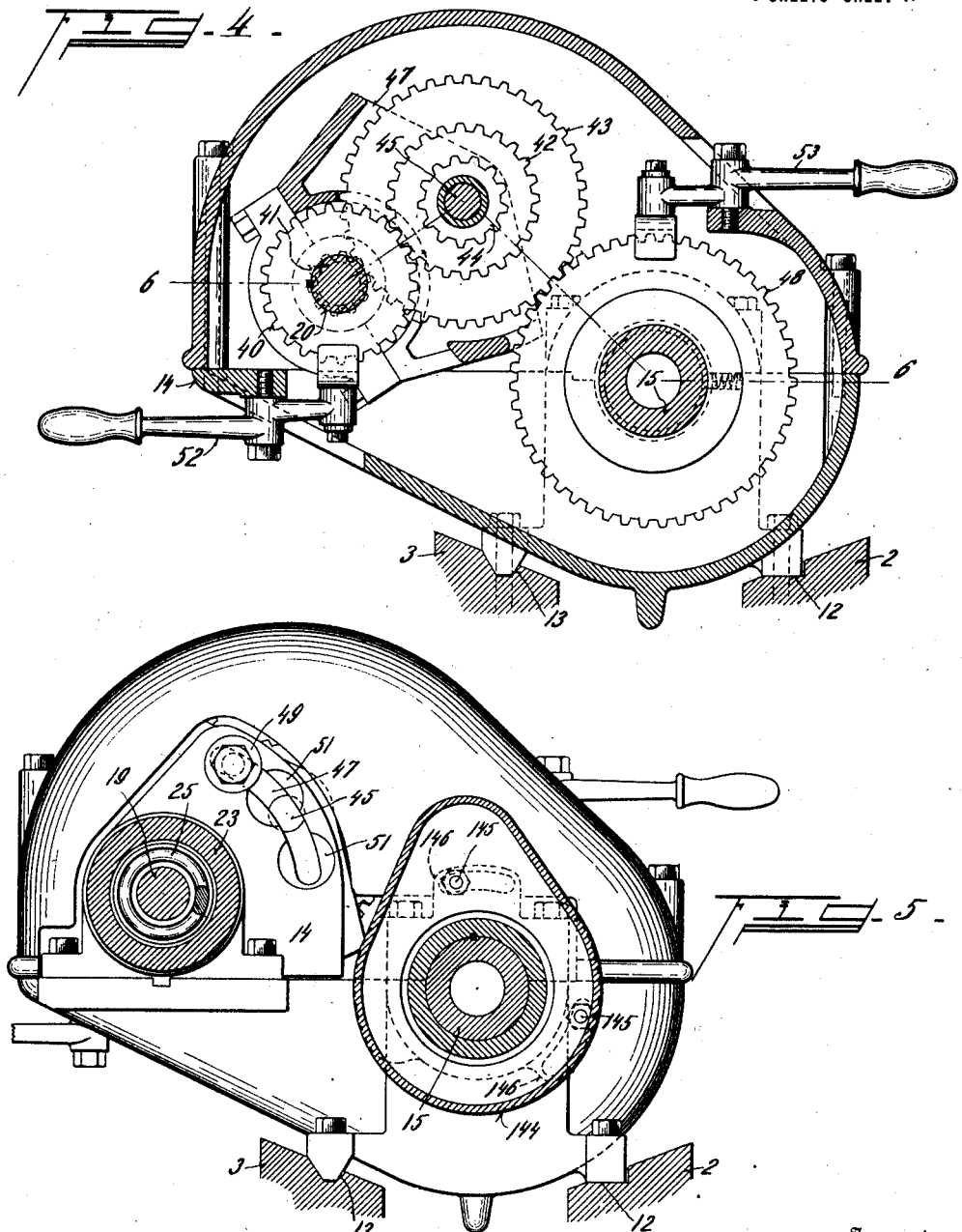

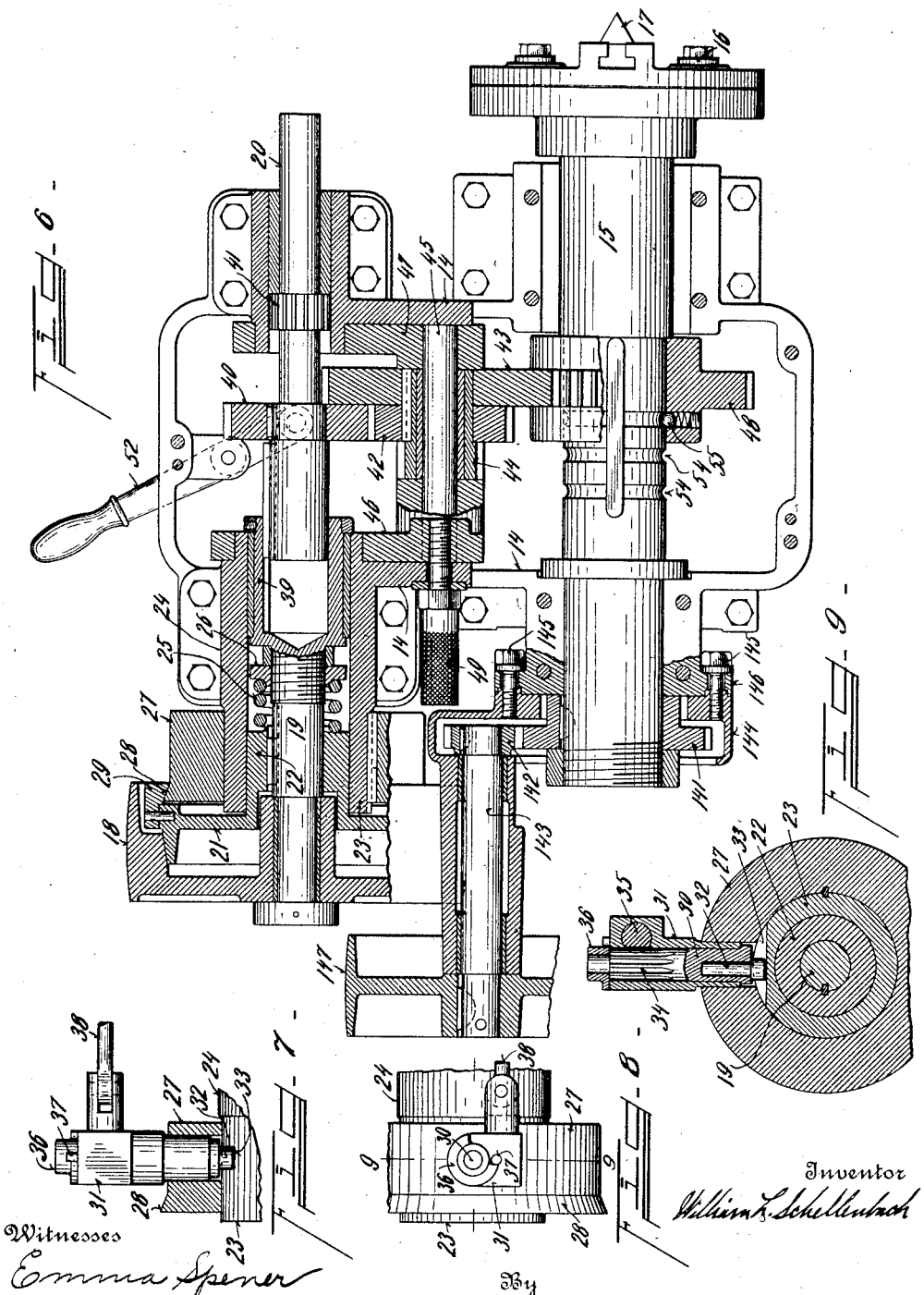

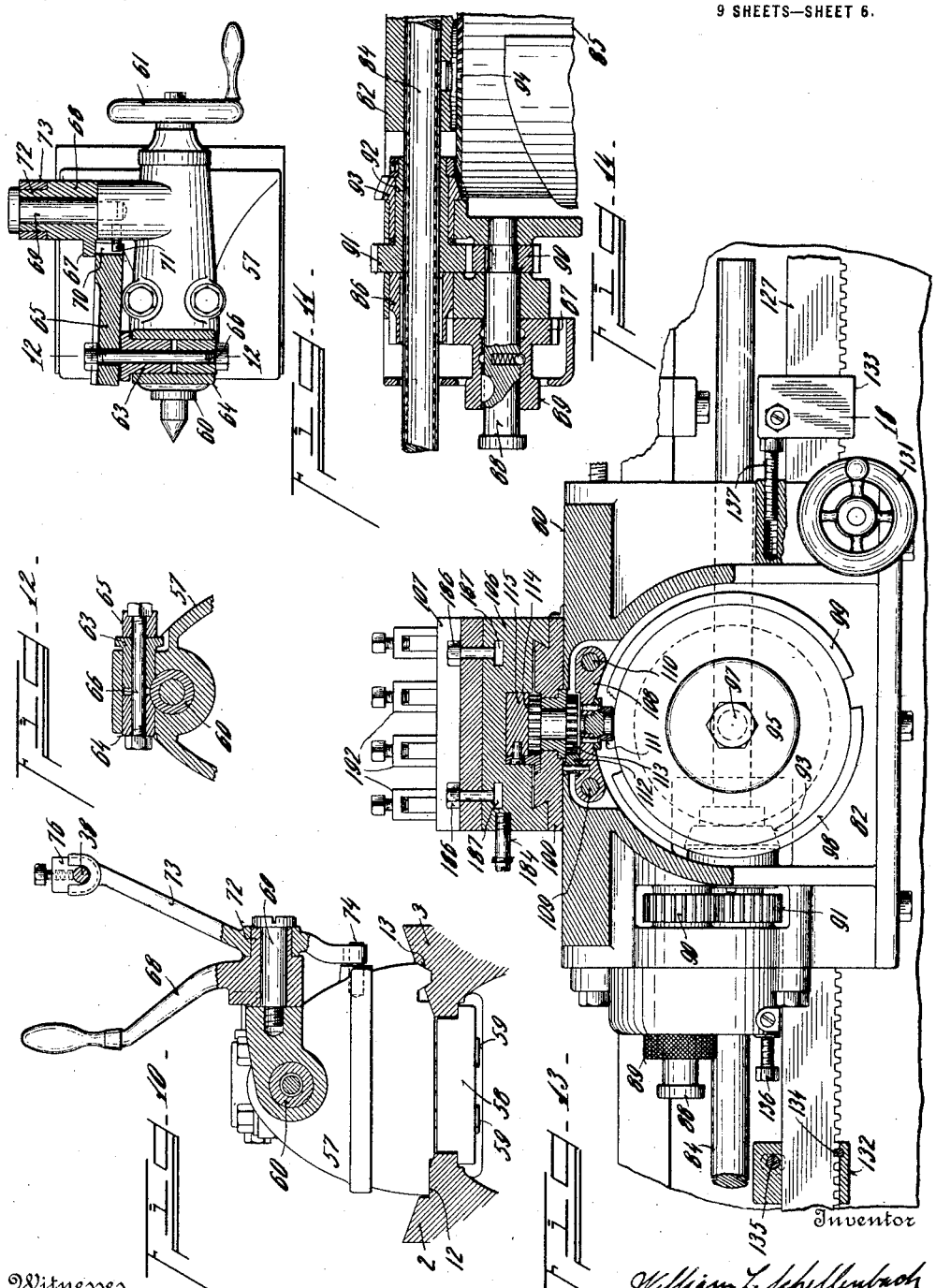

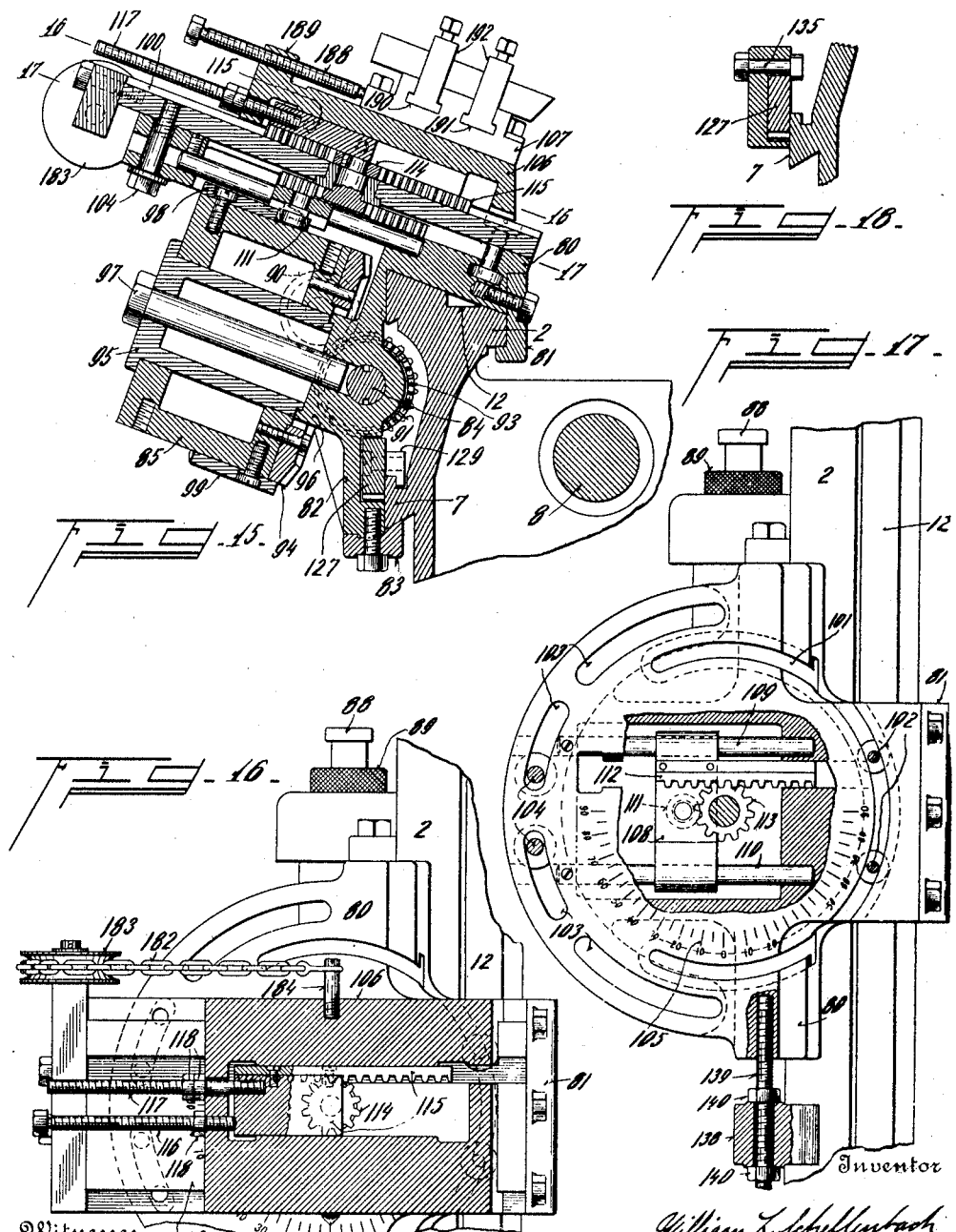

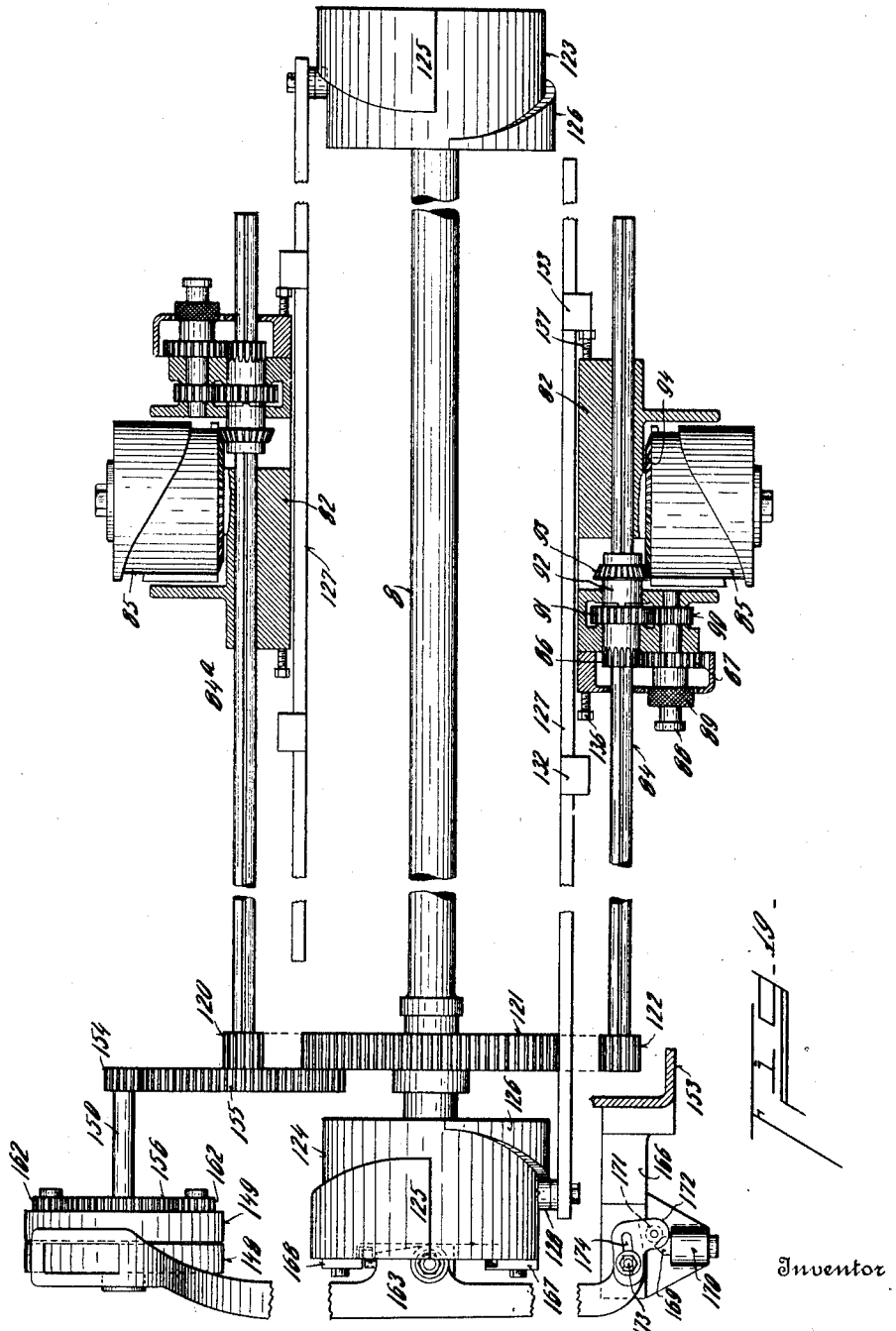

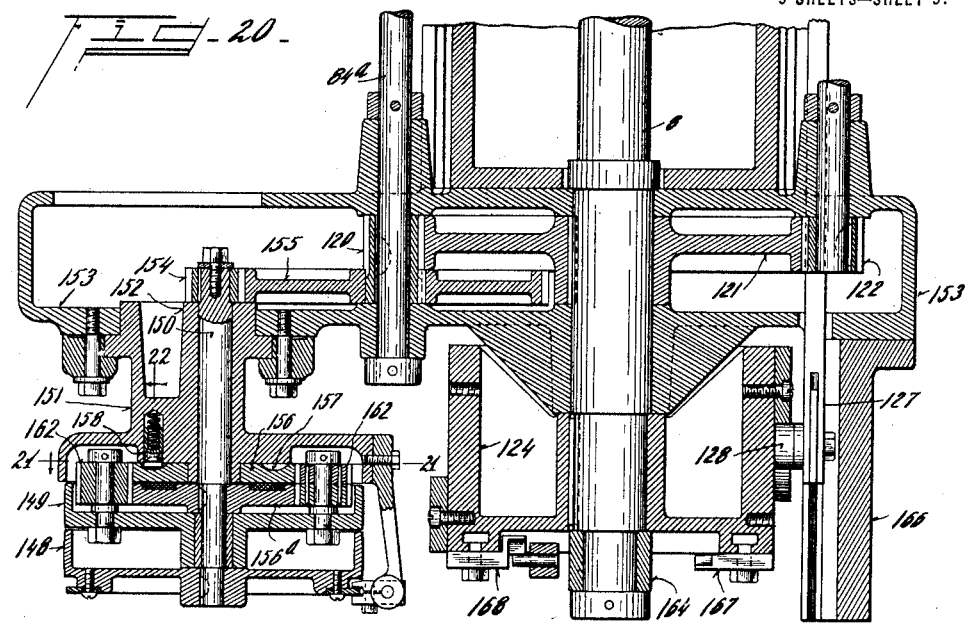

WILLIAM L. SCHELLENBACH, OF HARTWELL, OHIO.

AUTOMATIC LATHE.

1,322,352.   Specification of Letters Patent.   Patented Nov. 18, 1919.

Application filed October 12, 1914. Serial No. 866,333.

*To all whom it may concern:*

Be it known that I, WILLIAM L. SCHELLENBACH, a citizen of the United States, and residing at Hartwell, in the county of Hamilton and State of Ohio, have invented a new and useful Improvement in Automatic Lathes, of which the following specification is a full disclosure.

My invention relates to an improvement in lathes, wherein the characteristics of an automatic and ordinary engine lathe are combined for simultaneously performing upon the work a variety of operations of a duplicate or different nature and under automatic control.

Therefore, an object of the invention is to reduce expense, time and manual performances ordinarily required for machine work to increase the efficiency and utility of the machine, especially as a manufacturer's tool for machining or finishing a large number of duplicate pieces of work or parts. With the accomplishments of the tool multiplied, further objects of the invention may be directed to structural design and detail, to increase the durability of the tool to withstand the multiplied duties and strains, and with its adjustment and control obtainable within precision so as to universally adapt itself to a large variety of different kinds of work.

Another object of my invention is to provide a plural number of tool supporting carriages relatively oppositely arranged upon the lathe bed and at an angular disposition relative to a horizontal axial line of the work therebetween, whereby the bed qualifies as an abutment to staunchly resist the working strains of the cutting tool.

Further objects of the invention relate to the means for feeding the carriages or tool supporting members either in a singular or plural number longitudinally upon the bed with the traversing motions conveyed by a reciprocating bar moving at a rate consistent with the best metal cutting results, but capable of being operated at an accelerated motion for a quick traverse of the cutting tool during a non-cutting, retreating or resetting motion.

The reciprocating bar in this instance has a maximum length of stroke, determined by the throw of the transmitting devices, as that of a retractive cam, and the carriage feed traverse is coördinate or equal thereto, or its control regulatable to minor degrees thereof. The carriage may be fed intermittently either functionally through the transmission devices or reciprocating bar. A similar feed result is perceptible for the transverse feed of the cutting tool which is likewise obtained from mechanism having definite stroke lengths of reciprocation as a maximum and the traversing lengths of the tool coördinate therewith or capable of adjustment for minor degrees and the feed of the cutting-tool upon its carriage may extend in any direction.

Therefore, with a plurality of opposing cutting tools, each set may perform the same or different work independently or simultaneously or at timed intervals relatively.

As the range of utility, functions and advantages of this invention, together with its modes of operation, are of an extended latitude, further exemplification will be had herein by way of a detailed description and operation of the various parts, wherefrom a variety of further objects are readily comprehensive, apparent and deducible, without specific elaboration thereon herein, and, therefore, this specification will be confined to the description of the invention as illustrated in the accompanying drawings forming a part hereof, and in such drawings like characters of reference denote corresponding parts throughout the several views, of which:—

Figure 1 is a front elevation of the machine tool.

Fig. 2 is an enlarged sectional view taken on line 2—2, Fig. 1.

Fig. 3 is an enlarged end elevation from the left hand of Fig. 1, with portions thereof shown in section.

Fig. 4 is an enlarged section on line 4—4, Fig. 1, through the head-stock.

Fig. 5 is another sectional view of the head-stock taken on line 5—5, Fig. 1.

Fig. 6 is a mutilated sectional view horizontally through the head-stock taken on line 6—6, Fig. 4.

Fig. 7 is a mutilated detail sectional view, partly in elevation, of the shifting devices for controlling the spindle transmission.

Fig. 8 is a top plan view of Fig. 7.

Fig. 9 is a section on line 9—9, Fig. 8.

Fig. 10 is a sectional view through the tail-stock taken on line 10—10, Fig. 1.

Fig. 11 is a top plan view of the tail-stock shown in Fig. 10, with a portion thereof in section.

Fig. 12 is a section through the tail-stock on line 12—12, Fig. 11.

Fig. 13 is an enlarged front elevation of one of the carriages with a portion thereof in section.

Fig. 14 is a mutilated horizontal section through the carriage-feed transmission devices.

Fig. 15 is a central vertical section through one of the tool supporting carriages, including a portion of the lathe bed.

Fig. 16 is a section on line 16—16, Fig. 15.

Fig. 17 is a section on line 17—17, Fig. 15.

Fig. 18 is a vertical section through one of the carriage feed regulating dogs, as taken on line 18, Fig. 13.

Fig. 19 is a mutilated view of a diagrammatic character, and partly in section, illustrating the carriage feed transmission device for longitudinal and cross feed of the tool slides.

Fig. 20 is a section on line 20—20, Fig. 3.

Fig. 21 is a section on line 21—21, Fig. 20.

Fig. 22 is a section on line 22, Fig. 20.

Fig. 23 represents a horizontal cross-section through the tool posts.

This invention combines the principles of an automatic and an engine lathe in a unique organization to multiply the range in simultaneous operations of various similar and different metal cutting and finishing performances. It preferably incorporates two tool supporting carriages oppositely arranged, as a front and rear, whereby both may be used for turning or facing, or one may be used for facing while the other used for turning. It furnishes what may be termed a manufacturer's tool for finishing quantities of duplicate pieces within the shortest time consumption possible and the variety of working schemes are readily comprehensible to the mechanic for each particular piece of work and the range of a standard equipment is capable of taking care of about ninety-five per cent. of all the straight and angular work, so that the necessity for speed equipment is materially reduced.

The machine may also combine the principles of a turret lathe with a turret interchanged with the tail-stock increasing the latitude. The turret feature, however, is made the subject-matter of a separate application, and, therefore, elaborate explanation thereof will not be contained herein. In this respect, however, it may appropriately be mentioned that one of the carriage feeding devices is utilized for obtaining the movement of the turret without disqualifying such carriage.

Lathe bed.

The lathe bed 1 is of special design, materially different from the standard types of bed and is arranged to angularly support the tool supporting carriages, and suitably brace the same, offering a very rigid anchorage and way for the carriage. It is of box section form, providing two opposite rails each laterally flanged at their upper end, with the upper surfaces thereof longitudinally providing angular front and rear bearing surfaces 2, 3, inclined from the medial line of the bed upwardly and outwardly, and terminating with the vertical bearing surfaces 4 as a side bearing surface upon which the carriages slide respectively, and to which they are anchored. The outer side extremity of each being of dove-tail formation in cross-section, as is clearly shown in Fig. 2, and, therefore, provides an under surface extending beyond the walls of the bed to receive a clamping plate, and thereby resist vertical movements of the carriage. The inner edges of the way are each provided with the horizontal underlying surfaces 5, 6, to additionally secure the carriages upon the lathe bed. The carriages, therefore, have a surplus of bearing area, insuring true alinement and long life, and the planes upon which the carriages slide are arranged in relation to the centers so that the overhang of the cutting tools is avoided when they are operating near the center. Each side wall of the bed longitudinally is provided with a rail 7 projected therefrom, furnishing a plurality of bearing surfaces and the function of said rail will be more fully hereinafter explained.

A heavy shaft 8 defined as a drum shaft centrally journals in a bearing cast integral with the bed and at the tail-stock end, while the opposite end, at the head-stock, is supported within a feed-box. This shaft at each end is provided with drums for imparting longitudinal movement respectively to the front and rear carriages. The bed is suitably supported upon a leg 9 of cabinet design and interiorly has a diagonal wall 10 to deflect and drain the cutting chips and cutting compound into receiver at the rear of the machine. A trough 11 surrounds the lower portion of the leg and is preferably cast integral therewith, as shown in Fig. 2, which serves as the receiver for the chips and lubricating compound and from which the lubricating compound can be collected or repumped to the tools above. The angular surfaces 2, 3, are longitudinally recessed to provide offset ways 12, 13, for the head and tail-stock, and the head end of the bed is surfaced to receive the feed mechanism which is journaled in a casing member secured to said head end of the lathe bed. The supporting ways for the head-stock and tail-stock are shown in cross-section, Figs. 4, 5 and 10, which also illustrate how they receive the head and tail-stock respectively.

*Head-stock.*

The head-stock provides a support and casing for a variable speed system of gearing for driving the spindle and from which the power is distributed to the various parts of the machine. From the mechanism illustrated, six changes of speed may be obtained between the main driving pulley and spindle.

Referring to Figs. 4, 5 and 6, 14 represents the head-stock frame which provides suitable bearings for the spindle 15. The nose end of the spindle is arranged to receive suitable chucking devices, as represented by the reference character 16, for rotatively or otherwise clamping the work to the live center 17 or spindle. At the rear side of the head-stock, a driving pulley 18 is mounted, normally revolving loosely upon a sectional driving shaft, comprising a longitudinally confined shaft section 19 and a longitudinally movable shaft section 20, with the pulley revolving on said shaft section 19 and adapted to be clamped thereto, as shown by a friction clamping member 21. This clamping member has an annular conical surface which interiorly engages with the pulley. It has a hub extension 22, which journals and slides within the tubular bearing projection 23, of a supplemental frame 24, secured to the frame 14. The hub-extension 22 is splined upon the shaft section 19 and serves as a bushing therefor. A spring 25 engages the hub 22 at one end with the opposite end of the spring engaging a seat annulus 26, having a threaded engagement with the shaft section 19, so as to be adjustable thereon, whereby the tension of the spring 25 may be regulated. This spring yieldingly urges the clamping member 21 toward the pulley to lock the same therewith, and assist the lever controlling mechanism in its clutch clamping movement. It also provides a tension for brake mechanism utilized to check the rotation of the head-stock gearing and spindle, so as to relieve the rotative parts of any centrifugal momentum.

The brake mechanism comprises a collar 27 concentrically fitting the tubular projection 23, of the frame 24, and fixed thereto against rotation by a key with its periphery at one end inclined or tapered as at 28, to receive a correspondingly tapered annular surface of the annulus 29, fixed to and forming a part of the clamping member 21. The brake collar 27 is slidable upon its tubular bearing support to release the clamping member from its friction engagement with the driving pulley 18, compressingly against the tension of the spring 25, which tension resistingly binds under a wedge-like action the collar 27 and annulus 29, to qualify as a brake to retard the rotative motion imparted from the pulley, but yielding under excessive power so as not to cause any abrupt stoppage which would injure the parts. The brake and clamping devices are controlled distantly and herein simultaneously with the control of the dead center in the tail-stock to provide simultaneous operation in the control of the power and in the clamping and release of the work within the lathe centers.

The mechanism as illustrated for shifting the collar 27 and clamping member 21, comprises a stud-shaft 30, rotatively mounted and longitudinally confined within the tubular supporting member 31, fixed within a bore in the collar 27, see Figs. 7, 8 and 9. A headed pin 32 eccentrically projects into one end of the stud shaft 30, its head seated within a transverse groove 33 cut into the periphery of the tubular bearing 23, projecting from the frame 24, to provide an anchorage and an eccentric axis for the shaft 30, so as to impart longitudinal or reciprocating movement to the collar 27, with the rotation of the shaft 30. This moves the collar 27 and clamping member 21 toward and from the pulley 18, in controlling the drive and brake. The opposite end of the shaft 30 is circumferentially pivoted to serve as a rack pinion 34, which engages with the teeth of a rack bar section 35, slidably mounted within a bearing in the tubular support 31. To the free end of the shaft 30, projecting beyond the tubular support 31, a segmentally flanged collar 36 is fixed providing opposite abutments which alternately engage with the pin 37 fixed to the support 31, for definitely limiting the rotative or oscillating motion of the shaft 30, and thereby prevents excessive movement of the controlling lever in either direction, which if permitted would result in a wrongful functioning of the devices. The rack-bar section 35 is pivotally connected to a connecting rod 38, which extends to the opposite end of the lathe and connects with lever mechanism, to be hereinafter described, for actuating the dead center of the tail-stock.

As previously referred to, the main driving shaft is of sectional form with the shaft section 19 longitudinally confined and the shaft section 20 longitudinally movable. This provides a simple means for shifting the gearing fixed thereto to obtain a change in the speed. The shaft section 20 is telescopically engaged into the enlarged tubular end 39, of the shaft section 19, which tubular end journals and has a bearing within the frame 24, medially supporting the shaft section as a unit and prevents their coaxial displacement diametrically. The shaft section 20 has a splined connection with the shaft section 19, so that the two are unitarily rotative with the opposite end of the shaft section 20, slidably journaled within a bearing projection of the frame 24. Two gears, 40 and 41, of different diameter, are fixed upon the shaft section 20 and adapted to be alternately intermeshed with the gears 42, 43 respectively, likewise of different diameter, and qualifying as tumbler gears. The gears 42, 43, which may be referred to as elements of a compound gear or cone of gears, are fixed to a tubular hub-extension of the gear 44, loosely journaled upon the rock shaft 45, fixed into the ends of a pair of arms 46, 47, hingedly mounted upon bearing projections of the frame 24. The arms 46, 47, and shaft 45 may constitute a tumbler member for transferring the gears 42, 43, 44, to different elevations or positions to permit of a respective intermesh with the spindle gear 48, splined upon the spindle 15. The gear 48 is shifted longitudinally upon the spindle to aline the same with any one of the gears 42, 43, 44, as intermediates in a speed change operation. As shown in Fig. 6, gear 40 is intermeshed with gear 42 and gear 43 with gear 48, producing one transmitting train between the two-part shaft and spindle for one speed ratio, and the second and third changes of speed can be obtained by shifting the gear 48 to intermesh respectively with either gears 42 or 44, and adjusting the intermediate gears to properly intermesh therewith, which is accomplished by rocking the tumbler member, with the fourth, fifth and sixth changes produced or obtained by longitudinally shifting the shaft section 20, so as to disengage gear 40 from gear 42, and intermeshing gear 41 with gear 43, and suitably placing gear 48 so as to intermesh with any one of the gears of the intermediates for the change of speed desired. The tumbler frame is manually oscillated and locked in its adjusted position by the hand bolts 49, 50, see Figs. 1 and 6, respectively screw threaded into the arms 46, 47, and projecting through opposite sides of the frame 24. It provides two hand holds for swinging the arms to transfer the position of the gearing, after which the hand bolts 49, 50, are clamped against the walls of the frame 24 rigidly locking the arms as a tumbler support in their adjusted position. As shown in Fig. 5, it will be seen that the hand bolt 49 projects through an arcuate slot in the frame to guide the arc of movement for the tumbler gearing, and recesses are provided, as shown at 51, designating the different seating locations for the three changes of speed.

The shaft section 20 and its gearing are shifted by a forked lever 52, see Fig. 4, fulcrumed upon the lower rear portion of the frame 14, with its forked end projecting through an aperture in said frame and engaged with a gear 40. The spindle gear 48 is shifted upon its spindle by a forked lever 53 fulcrumed upon the upper forward portion of the frame 24 and projects through an aperture therein with its forked end engaging the gear 48.

To locate the three positions of gear 48, which it occupies for producing the various speed changes above referred to, I provide the spindle with three annular grooves 54, properly spaced to bring the gear 48 into alinement respectively with the gears of the tumbler series. A ball detent 55 is sustained within the hub of the gear 48 yieldingly urged and adapted to engage into a respective groove around the spindle 15. Thus the operator can very conveniently locate the proper position at which gear 48 must be set in its speed changing operation.

*Tail-stock.*

In describing the tail-stock, reference is principally had to Figs. 1, 10, 11 and 12. Its construction does not materially differ from the general design in common use, with the distinguishing features herein relating principally to the clamping mechanism for its spindle, controlled by a lever, which correspondingly controls the mechanism for starting, stopping and breaking the transmission devices within the head-stock. Thus a single lever mounted upon the tail-stock within convenient reach of the operator binds or clamps the tail-stock arbor or spindle, starts the machine, or alternately stops the machine, brakes the head-stock spindle to resist its rotation and releases a clamp of the tail-stock arbor, and this is accomplished by the movement of a lever to the right or left. The tail-stock frame 57 seats upon the ways 12, 13, of the bed and is secured to the bed by a clamp-plate 58 engaging the opposite rails of the bed beneath the angular bearing surfaces, as shown in Fig. 10. The clamping plate is bolted to the head-stock frame by two bolts 59. The spindle or arbor 60 is supported within the tail-stock and is preferably non-rotative, but is capable of being translated longitudinally by the hand wheel 61 in the well known manner, the arbor carrying the dead center 62, which engages into the work.

I have provided means for rigidly clamping the tail-stock arbor or spindle which comprises a pair of tubular clamping members 63, 64, mounted in a bore transversely to the spindle and relatively upon opposite sides of a diametric line of the spindle and engaged with its periphery. Thus as the two clamping members are urged toward each other, they will securely bind the arbor against movement. The clamping members are moved simultaneously by a lever 65, adjacent the member 63 and fulcrumed thereon. The lever 65 is connected to the member 64 by a bolt 66 passing concentrically through said members, with the nut or head of the bolt engaged with the end of the member 64, while the opposite end of the bolt is engaged with the lever 65. In canting the lever it will engage and fulcrum upon an edge of the member 63, forcing the bolt 66, with its member 64 in one direction and the member 63 in an opposite direction, or the two members toward each other. The lever is canted by the cam 67 projecting from the lever 68, pivotally mounted upon the tail-stock by the stud bolt 69. With the axis of the cam tangent to the arc of lever movement, it will be seen that the lever 65 remains set in any degree of movement upon discontinuing the movement of the lever, so that additional locking instrumentalities are not required, and the cam, therefore, has a two-fold function. The free end of the lever 65 has a notch 70, into which a pin 71 engages for supporting said free end and prevent its displacement from its position adjacent the cam.

The lever 68 is provided with an eccentric hub projection 72, which engages into an orifice of the lever 73, adjacent and in rear of the lever 68 to operate said lever simultaneously with lever 58. One end of said lever 73 is pivotally connected at 74 to the tail-stock frame, while the opposite end is forked and engages between the dogs 75, 76, adjustably secured upon the rod 38, providing a connection between the head and tail-stock for simultaneously controlling the transmission devices of the head-stock and clamping devices of the tail-stock. The eccentric hub 72, rocking the lever to the right or left correspondingly with the movement of the lever 68, providing a positive connection between said members with relatively varying degrees of movement.

*Carriages.*

As principally illustrated in Fig. 2, two carriages, duplicates of each other, are employed, one at the front, the second at the rear of the bed, each is respectively gibbed to a bed rail or wall, with their cutting tool or tools disposed at an angle in a diametric line with the work center and each carriage is traversed longitudinally upon its rail, either by hand or power, they each pivotally support a compound rest which can be swiveled to opposite sides of a neutral or zero point, with the angular adjustment definitely determined by suitable graduations, the compound rests support a tool rest constructed to receive a plurality of cutting tools, the arrangement of each compound rest is such that both carriages may be working at different angles for cutting tapers or bevels simultaneously or one carriage may turn the taper while the second is finishing straight work, or one carriage may be employed for turning, say the face angle of a bevel gear, while the other is turning the front and rear angles, thus a variety of different or duplicate operations may be simultaneously or independently performed. As the carriages are duplicates of each other, a detailed description of one will answer the purposes herein, each carriage comprises a body portion 80 engaged over the upper face of its rail, disposing the same longitudinally at an angle therewith, and one edge thereof confined on the rail by an angle retaining plate 81, see Figs. 2 and 15, and engaging with the underlying surface 5, say of the forward rail, (the description herein being confined to the forward carriage). A depending apron 82 is formed integral with the body portion 80, engaging with the upper vertical bearing surface 4, and the vertical bearing surface of the rail projection 7 and confined to said rail by a retaining block or plate 83. Such apron anchorage together with the angular seating of the carriage upon the ways of its rail securely mounts the carriage to resist strains transverse to its longitudinal feed. The apron 82 provides a journal and support for transmission devices for transversely feeding the cutting tools, with a cam drum as a prime mover in the control of the transverse cutting tool feed. Cam drums are utilized for producing both transverse and longitudinal feeding motions in either forward or reverse direction. They are constant as to their direction of rotation and adapted to be run on various rates of speed, and their cam contour governing the direction and also rate of feed and capable of producing a variety of feed results in each cycle thereof. As a plurality of these cam drums are employed, provision is made for relatively timing the same, which feature, however, will be more fully hereinafter described.

A feed shaft 84 projects through and is journaled in the apron 82, which is driven by suitable transmission devices, to be hereinafter described. This shaft 84 imparts motion to a series of transmission elements, which likewise serve as a power control, and which is principally illustrated in Figs. 14 and 19, for rotating the cam drum 85, which imparts the transverse feeding motion to the tool slide, a series of gears being employed for obtaining the proper speed and the arrangement may be variously modified to comprise a means for coupling the feed shaft and drum. In the arrangement shown, a gear 86 is splined upon the feed shaft, supported and journaled within the apron. The pinion 86 intermeshes with the pinion 87 longitudinally movable upon the stud shaft 88, supported within the apron. Said gear 87 has a hub extension 89, providing a handhold for sliding the gear longitudinally upon its shaft into and out of mesh with pinion 86, for connecting and disconnecting the drive at the carriage, suitable detent devices being provided for lockingly maintaining the gear 87 in its shifted positions.

A second gear 90 is fixed to the shaft 88, in mesh with a gear 91, loosely rotative upon the feed shaft 84, and longitudinally confined within its journal in the apron. The gear 91 has a tubular hub extension 92, which concentrically receives the bevel gear 93, and to which said gear is rotatively fixed. The gear 93 meshes with a bevel gear 94, fixed to one end of the cam drum 85. The cam drum is provided with a bushing 95 upon which the drum loosely rotates, the bushing being fitted into a boss projection 96, extended from the apron and secured in place by a bolt 97. The periphery of the drum is provided with the opposing segmental cam plates 98, 99, which respectively impart a forward and reverse rotation to the compound rest.

Rack and pinion devices are provided for reciprocating the tool carrier and to increase or vary the movements of the tool carrier relatively with the throw of the cams, and also provide for the setting of the tool carrier relatively to and from the work independently of the movements of the cams, and without interfering with the swiveling action of the tool-slide 100. As shown in Fig. 17, the carriage table 80 is of semi-circular form, with its upper surface provided with the segmental circular T-slots 101, within which the T-bolts 102 are engaged for securing the tool-slide 100 upon the face of the carriage. The forward portion of the carriage has a number of segmental circular slots 103, to provide an anchorage for the clamping bolts 104, for locking the tool-slide rigidly in any adjusted position to the carriage. The face of the carriage is provided with graduations 105, upon opposite sides of a zero point defining graduations to ninety degrees, a range of oscillative adjustment of the tool-slide. The T-bolts 102 may be regarded as confining means to secure the tool-slide against lateral movement and guide the same in its oscillating movement, while the bolts 104 may be regarded as clamping means for securely and rigidly binding the slide upon the carriage. The upper surface of the tool-slide is dove-tailed to provide a way for the tool-rest 106, gibbed upon the tool-slide, the tool-rest in turn providing a support for the tool-block 107, which, in the instance herein, is arranged to receive a plurality of cutting tools.

The tool-slide may be referred to as a non-reciprocating member, and the tool carrier 106 as a reciprocating member sliding upon the non-reciprocating member for feeding or withdrawing the cutting tool or tools from the work. Thus, the tool-carrier may be reciprocated or traversed in various directions by reason of its swiveled support for angle or bevel cutting. The reciprocating stroke of the tool-carrier may be varied as to its length and either constant or differential as to its forward or retreating stroke. Its latitude of operation is very extended and universal to adapt itself for finishing a variety of work. With the cam drum 85 as the prime mover for reciprocating the carrier it will be readily apparent that its cam contour controls the direction of stroke of the carrier as well as its rate of translation which may be intermittent or gradual in one direction, and accelerated in a reverse or retrieving direction or its control variable in either direction in a drum cycle. The tool in any instance may be fed toward the work slowly and after a period quickly retracted to perform as a relieving mechanism.

Again the tool may be moved quickly toward the work and its feed brought to neutral during an interval of the longitudinal feed of the carriage.

It is deemed not necessary herein to further elaborate upon the variety of strokes possible by the mechanism herein, for the same is readily discernible to anyone familiar with the details of construction.

The tool-carrier is reciprocated or traversed upon the slide by rack and pinion devices upon opposite sides of the tool-slide 100, with the intermediate connection for said devices coaxial with the tool-slide to permit the slide to be swiveled without interrupting the motion imparting devices.

The carriage table 80 is apertured to receive the sliding or reciprocating rack member 108, slidably mounted upon the parallel guide rods 109, 110, rigidly secured within the table of the carriage. The rack member 108 has a roller 111 dependingly supported therefrom and adapted to engage with the cams 98 and 99 upon the drum 85, and thereby reciprocate the rack member 108 upon the guide rods 109, 110. The rack member 108 has a rack element 112, fixed thereto and meshed with a pinion 113, journaled in the tool-slide and its shaft or axis coaxial with the slide and projected through the same with its upper end provided with a pinion 114. This pinion 114 is engaged with a rack reciprocating member 115, supported within the tool-carrier 106. This rack member is longitudinally adjustable within the tool-carrier and the means, therefore, of such construction is to permit a variance in the stroke length of the carrier relative or coordinate to the stroke lengths of the member 114.

The rack member 115 is longitudinally adjustable within the tool carrier for altering the translating length of the carrier for varying the same from the definite operation of the cam, or for adjusting the location of the carrier upon the slide. The screw 116 screw threads through the wall of the tool-carrier, with one end abuttingly engaging with the rack member 115. The screw 117 projects freely through an aperture in the wall of the tool-carrier and is rigidly secured to the rack member 115, with the nuts 118 providing adjustable abutments for engaging the wall of the tool-carrier. As illustrated in Fig. 16, the screws 111 and 117 are set to rigidly connect or couple the tool-carrier and rack member 115, so as to move as a unit. The tool-carrier, therefore, may be adjusted upon the guide-member 100 toward and from the work by relatively adjusting the screw 116 and nuts 118. If, however, an intermittent motion or stroke of the tool carrier be desired, less than that of the rack member 115, the screw 116 and nut 118 are relatively adjusted to relieve them of the clamping function, in which instance, they function alternately relatively to the forward or retreating strokes of the rack member, with the adjustment of such predetermined degree to permit idle motion of the rack member before a coupling with the tool-carrier is effected. With such contemplated adjustment, the screw 116 and rack member would be engaged for the retreating movement and the screw 117, with its nut, utilized for the forward actuation of the tool-carrier.

The cams 98, 99, may possess a standard functioning contour for producing a tool-carrier reciprocation of a maximum stroke length for each cycle of the drum, and constant as to its operation, while the tool-carrier may be neutralized or its translating lengths varied in minor degree from the maximum transmitting length of movement of the cam, so that the range is more extensive from that produced by a particular shape of cam.

With a particular outline of cam contour and the relative progressive arrangement of two opposing cams upon the drum, the movement of the rack member 108 is coördinate therewith as to its reciprocating stroke lengths, and ratio, but it is apparent that the contours of the cams are susceptible to an indefinite variety of designs and modifications to meet the feed results required for different kinds of work. The forward and retreating motions may be in a plural number to a drum cycle, or their alternate strokes varied as to their speed ratios, and the strokes may be constant or intermittent.

For straight work, the two cams are progressively spaced to provide neutral intervals for the tool carrier, and the rotation of the cam drum timed relatively and coördinately with a similar cam drum for longitudinally power traversing the carriage.

The cam drums for the longitudinal traverse of the carriages are fixed upon the ends of the central shaft 8, with the feed shafts 84, 84ª, of both front and rear shafts of constant relative rotations and at relative constant ratios of speed for a coördination tool feed, and a differential result produced through the speed change system of gearing carried by each carriage, as heretofore described.

The rear feed shaft 84ª, in this instance, is employed also as a driver and receives its rotation through transmission devices connecting with the lathe spindle, to be hereinafter more fully described. This shaft 84ª has a gear 120 fixed thereon (see Fig. 20), in mesh with a larger diameter gear 121 fixed upon the central shaft 8, and said gear 121 meshes with a gear 122 fixed upon the front feed shaft 84, the gears 120 and 122 being of the same diameter, and, therefore, rotate at the same rate of speed.

*Carriage longitudinal feed.*

Each end of the central shaft 8 has a cam drum fixed thereon, which herein follows the construction of the cam drum mounted upon each carriage. Cam drum 123 on the right end of the shaft 8, (see Fig. 19), longitudinally traverses the rear carriage, and cam drum 124 at the left end traverses the front carriage. These drums and carriage connections are the duplicate of each other, therefore a detailed description of one will be sufficient.

Each of the cam drums 123, 124, has a pair of alternately functioning cam plates 125, 126, progressively arranged upon their drum periphery, and removably secured thereto, one for imparting a forward and the second a retreat or reverse feed to its carriage.

This utility corresponds equally to that of the traverse or cross feed drum, as described upon the carriages, with additions however, combined with the left end drum for automatically controlling the transmission device, to be hereinafter described.

Confining the description to the left end drum and front carriage, it will be observed from Figs. 1, 13 and 19 that a rack bar 127 extends longitudinally parallel with the lathe bed, connected at one end, (the left), with the cam drum 124. It is provided with a roller 128 which engages the cam contour of the cam plates 125 or 126 in each drum cycle, for reciprocating said rack bar.

The rack bar is supported on a respective lathe bed rail or wall by a series of hook blocks 129, (see Fig. 15) fixed to one side of the rack bar and engaged over the rail flange 7. The rack bar passes between the carriage apron and bed rail or wall, with its rack teeth intermeshed with pinion 130, journaled within the carriage apron, (see Fig. 2). The axis of the pinion 130, projects forwardly and is provided with a hand wheel 131 for manually longitudinally feeding the carriage.

The power longitudinal feed of the carriage, in this instance, is of a minor degree as compared with the maximum feed length of the carriage, and is limited to the rise of each cam or width of the drum. The carriage feed or traversing length, however, is variable as to the constant feed length of the cam drum, from its equivalent to neutral.

The rack bar at opposite sides of the carriage is provided with the dogs 132, 133, and clamped thereto to render the same adjustable or transferable upon the rack bar longitudinally. The dogs, in their preferred form of construction, comprise a grooved plate fittingly clasped to the bar, (see Fig. 18), and provided with a transverse tooth 134, meshing between the teeth of the bar. A bolt 135 transversely projects through the plate above the bar, with its head adapted to engage the offside of the bar and be clamped thereto. Each end of the carriage apron has a screw 136, 137, relatively oppositely projected, each adapted to engage with its respective dog 132, 133. The screws offer an adjustment for varying the carriage feed lengths or strokes with micrometer precision.

When both dogs engage with the carriage its feed is equal to that of the rack bar, separating the same, however, causes the dogs to function alternately, one for moving the carriage in one direction and the second conversely.

Carriage clamping.

I have provided means for rigidly clamping the carriage upon its rail or bed, and, as illustrated in Figs. 1 and 17, comprise a two-part clamp member 138 which clasps the forward upper portion of the side rail and is removably clamped thereto. A screw 139 fixed to and projected from the carriage engages through an orifice in the clamping member 138 and is locked thereto by the nuts 140 engaging opposite sides of said clamping member. This means very rigidly clamps the carriage upon its rails or to the bed, and its setting position accurately is located relative to the work, and within micrometric precision.

Feed transmission.

The feed transmission for rotating the longitudinal and cross feed drums is of a variable speed type, automatically controllable for imparting different rates of speed in a drum cycle. A slow and quick motion of the drum, therefore, is possible for each drum cycle. The cutting tools may be advanced toward the work slowly or at the proper feed travel required and quickly retreated. The transmission is driven by a belt from the head-stock by the spindle.

A gear 141 is fixed to the spindle 15, see Fig. 6, in mesh with a gear 142 upon the shaft 143. The shaft 143 is journaled within an extended bearing sleeve projecting from the gear casing 144. The casing 144 being secured to the headstock, and adjustably swiveled thereto, qualifying for belt tightening, and is clamped in its adjusted position by the bolts 145, projecting through apertures of the flange 146 of the head-stock frame. At the opposite end of the shaft 143, a pulley 147 is fixed thereto, having a wide face to accommodate for shifting the belt 147ª, so that it may alternately engage with either one of the pulleys 148, 149, adjacently disposed upon the shaft 150. The pulley 148 is fixed upon the shaft 150, to provide a direct drive for high speed transmission. The pulley 149 is loosely rotated upon said shaft and connected therewith through a differential gear system. The shaft 150 is journaled within a hub extension 151, of the casing section 152, and the hub of said casing section supported within a casing section 153, secured to the left end of the lathe bed. The casing 152 swivels within its bearing in the casing 153 for axially adjusting the shaft 150, which is journaled eccentric to the axis of the hub, for moving said shaft toward and from the feed shaft 84ª to provide an adjustment for the employment of change gears to be fixed to the end of said shaft for varying the speed between the shaft 150 and feed shaft 84ª. The shaft 150 is provided with a gear 154 as a selected side of a change gear, which is removably fixed to said shaft, and meshes with a gear 155 fixed to the hub of the feed shaft gear 120.

As a very slow feeding speed is desired, I have provided a differential gear system intermediate the pulley 149 and shaft 150, which comprises a gear member 156 loosely supported concentrically upon the hub projecting from the casing 152, and coaxially with the shaft 150, and said gear may also be regarded as a ratchet member adapted to be locked against rotation in one direction. To this end it is provided with a circumferential series of notches 157, each adapted to respectively receive a yielding pawl 158 which is laterally slidable within a bore in the casing section 152 and urged outward by a spring 159. The exposed end of the pawl has an inclined portion 160 terminating with a shoulder 161 offering a releasing movement of the pawl in one direction of rotation of said gear member 156 and lockingly engaging therewith in a converse rotation of said gear. Adjacent the gear 156, a companion gear 156ª, fixed to the shaft 150, is provided. These gears are of equal diameter, but possess different numbers of teeth, and for exemplification, gear 156 has sixty teeth, while gear member 156ª has sixty-one teeth, to provide an advance of the shaft 50 a distance equal to one tooth for each cycle of the pulley. The gear members 156 and 156ª are each in mesh with a plural number of planetary gears 162 rotatively supported upon one side of the pulley 149. Such differential gear system operating as follows:—

Assuming pulley 149 as rotating to the right carrying with it the planetary gears 162, moving about the axis of said shaft in the same direction with the pulley and being engaged with the gear members 156, 156ª, having a rolling tendency upon their peripheries. The pawl plunger 158, locking the gear member 156 against rotation in a direction reverse to that of the pulley, causes the gear to serve as an abutment so that gear 156ª must be advanced in the same direction as the pulley, one tooth in each cycle of planetary gears around the pulley axis, furnishing a wide ratio of speed between the pulley and driven shaft 150.

This construction enables a change to be made from the high to low, or vice versa, without injury to the mechanism and without any jar and without slowing down the power and with a belt as a prime mover, a shifting from one to the other is easily, automatically accomplished, owing to the coincident rotative influence of all the members.

The automatic control of the speed of the transmission mechanism must be coördinately at timed intervals with the rotative cycle of the drums, and, therefore, the shifting mechanism for shifting the belt is actuated by the left end longitudinal feed drum, which initially partially shifts the mechanism and provides for an energy storage to complete a belt shifting operation.

The mechanism employed for shifting the belt comprises a lever, (see Figs. 3 and 19), 163, fulcrumed upon a collar 164, mounted upon the end of the central cam shaft 8 and adjacent the left end longitudinal feeding drum. One end of said lever is slotted to receive the belt 147ª, while the opposite end is slidably supported upon a bracket 166, fixed to and projecting from the gear casing 153, which coöperates with tension devices to effect a quick partial stroke, completing the movement of the lever in its appropriate belt-shifting direction. The lever is initially shifted in either direction by tripping dogs fixed to the side of said end drum. 167 represents a dog for shifting the lever to transfer the belt from a left to a right position, and the dog 168 employed for conversely shifting said lever, in each rotative cycle of said drum.

These dogs in each drum cycle progressively engage a pin projected from an offset of the lever in a direction diametric with the drum, and each dog 167, 168, has a chisel pointed tooth transversely projected therefrom in relative opposite directions to engage a respective side of said pin and thereby partially shift said lever in its appropriate direction, depending upon whichever of the dogs is in engagement therewith. This action transfers the belt from one pulley surface toward and upon a second, but not sufficiently to relieve it absolutely from the speed inertia or driving pulley influence from which the belt is being transferred. From such partial positive belt-shifting operation it is followed by a quick movement through automatically operated devices, which completes the shifting of the lever, enabling the throw to be accomplished at a concise interval and not interrupted from a complete shift, as might occur if the positive shifting devices were only relied upon. Such quick completing movement of the lever is accomplished by a spring tension plunger 169, which is depressed against the tension of the spring during the initial or positive belt-shifting action to store energy for the final belt-shifting movement. The plunger 169 is slidably housed within a bore of the boss 170, integral with the upper surface of the bracket 166, and has its ends chisel-pointed to provide opposing tapers or facets adapted to be alternately engaged with a roller 171, journaled between the furcations of the forked end 172 of the lever 163, thereby functioning as a wedge in the forward movement of the plunger to complete the throw of the lever.

The plunger operates for either right or left movement of the lever, being depressed as the lever is moved upon one taper toward the apex, and as soon as the axes of the roller and plunger become slightly eccentric upon an opposite side from which it is being moved it will be released to exert its pressure for lever movement. The lever movement is confined by a pin 173, projecting through a slot 174, in the lever, and secured in the bracket 166, which limits the arc of lever movement to within that required for properly transferring the belt from one pulley to a second, and when the lever occupies either of its throwing limits it is locked or stabilized by the plunger at such limits.

The number of shifting dogs may be varied, as well as their relative location upon the drum to produce the required belt-shifting operation in each cycle of the drum and at any desired periodicity or time relative to the movement or movements of the work performing member or cutting tool. Thus the cycle of the cam drums may be retarded or accelerated, transmitting corresponding results in any direction of feeding motion of the cutting tools.

Tensioning mechanism.

Means are provided in connection with each tool-carrier or rest 106 to apply a constant invariable force to move the tool carrier in the direction of the tool traverse away from the work to prevent backlash or improper irregular advancing motion beyond or in excess of that of a positive propelling degree transmitted by the controlling cam. Such objectionable forces may be the result of a coaction between the tool and rotative work, tooth chatter of the feeding or transmission devices or other causes, and to eliminate or neutralize such deleterious forces, a suspended weight 175 is in connection with each tool-carrier, and, in this instance, a single weight serves in common for all the carriages and is effective at any location thereof. The weight 175 is housed within the pedestal of the machine, as illustrated in Fig. 2, and suspended from a cross-bar 176 projected laterally in opposite directions through apertures in the walls of the pedestal, with the ends of the bar respectively engaged with a crank pin 177, of a crank arm 178, fixed to a respective front or rear shaft 179, 180. As the tensioning device for both front and rear tool-carriers are the duplicates of each other, a description of one will answer herein, it, however, being understood that while only one weight is employed, the tensioning forces for each carriage are independent of the other. Each shaft 179 and 180 is coextensive of the carriage traversing length upon its bed or rail, and each is supported with journal brackets at each end of the respective shafts and fixed to the pedestal.

A chain-receiving sector 181 is splined upon its shaft, say 179, and transferable or slidable longitudinally thereon to adjust the same to a proper alinement position with its relative tool carrier. The sector rocks with the shaft in a direction coördinate to the traversing motion of the tool-carrier, thus applying its tensioning force constantly. The sector is peripherally grooved to receive the chain 182, which has one of its ends fixed thereto, and extended upwardly over a sheave 183 journaled upon the tool-slide and connects with a pin 184, projecting from one side of the tool-carrier or rest 106.

It will be observed that the weight bar 176 qualifies as a lever with the opposite crank pins 107 alternately functioning as a fulcrum about which the lever may turn during the rocking motion of the other crank-pin, and to accommodate for the arc of lever movement it will be observed that one crank-pin has a permanently located connection with the cross-bar, while the opposite end of said bar is longitudinally notched, adapting the same to slide upon such opposite crank-pin. The cross-bar tends to depress the crank arms under the force of the weight, thereby rocking the shafts and their sectors compensating for the movements of the tool-carrier for a constant application of the tensioning forces.

Tool-blocks.

The tool-blocks herein provided are adapted for mounting a plurality of cutting tools in adjacent tiers and comprise a block member 107, having front and rear space flanges for securing the block to the tool-carrier, which flanges receive T-bolts 186, the heads of which fit into longitudinal bolt-slots 187 in the upper surface of the tool-carrier or rest.

As shown in Fig. 15, the block is adjustable on its carrier by a screw 188, supported by a lip 189, projecting from the face of the carrier. The tool-block has two transverse tool-post slots 190, 191, for adjacently receiving a plurality of tool-posts 192, the drawings illustrating four sets of posts, each pair receiving a cutting tool through alined apertures therein and to which they are clamped in two positions of tool length.

The tool-blocks, herein illustrated, may be regarded as of standard design, having an adjusting capacity for a large range of different kinds of work, but it is obvious that special tool-blocks may be clamped upon the carrier and adjusted to a proper operating position.

Having thus described my invention, I claim as new and desire to secure by Letters Patent of the United States:—

1. In a machine of the class described, a head-stock, a rotative spindle journaled therein, transmission devices therefor, a tail-stock, a non-rotative longitudinally movable spindle thereon, clamping devices for said tail-stock spindle, and means for simultaneously controlling said transmission device and clamping device.

2. In a lathe, a supporting member, a superposed member swiveled thereon, a tool carrier slidably mounted in said swiveled member, a shaft coaxial with said swiveled member and journaled therein, a pair of gears fixed to said shaft upon opposite sides of said swiveled member, rack devices connecting with said tool carrier and a respective gear, and rack devices underlying said swiveled member, and means for reciprocating said last mentioned rack devices.

3. In a lathe, a traversing member, a superposed member swiveled thereto, a reciprocating tool carrier slidably mounted on said swiveled member, a through shaft coaxial with said swiveled member and provided with gears at opposite ends, means carried by the traversing member for rotating said shaft, and means coöperating with said shaft to reciprocate the carrier and adjustably connected therewith for varying the carrier traversing lengths and shifting the same upon said superposed member to transfer its section of traverse.

4. In a machine of the character described, a non-reciprocating member, a carrier slidably mounted on said member, and means for traversing said carrier, and independently adjustable stops carried by said non-reciprocating member and said carrier to feed said carrier and to vary the length of its traverse movement.

5. In a machine of the character described, a member, a second member pivoted thereto adapted to be turned into a predetermined position, a tool support slidably mounted on said second member, transmission devices supported by said first member, means operative through the pivot between said first and second members adapted to be actuated by said transmission devices to reciprocate said tool support, and independently adjustable stops carried by said pivoted member and said tool support in operative connection with said means for determining the length of stroke of said reciprocations, and to shift said tool support upon said second member.

6. In a machine of the class described, a track support, a carriage mounted and longitudinally traversing thereon, a guide member rigidly clamped upon said carriage, a tool carrier adapted to traverse on said guide member, a rotative cam member, motion imparting devices intervening said cam member and carrier for traversing said carrier, and adjusting devices independently adjustable and operable in connection with said motion imparting devices to adjustably determine the length of traverse of said carrier.

7. In a machine of the class described, a tool carriage, a tool carrier slidable thereon, independently adjustable coupling members to connect and limit the movement of said tool carrier relative to said tool carriage, means for traversing said tool carrier, and constant resistance means connecting with said tool carrier for applying a pressure opposed to one direction of carrier traverse.

8. In a machine of the class described, a lathe bed, a carriage slidable thereon, a tool carrier traversing upon said carriage in various directions, a rotative drum member upon said carriage, cam members upon the peripheries of said drum member, and a shaft having gears rigidly mounted at opposite ends, and rack mechanism to engage said gears to reciprocate said tool carrier.

9. In a machine of the class described, a lathe bed, a carriage slidable thereon, a tool carrier traversing upon said carriage, a rotative cam member upon said carriage constant as to its direction of rotation, means upon said carriage intervening said tool carrier and cam member for traversing said carrier, and independently adjustable coupling devices operative in connection with said last named means to determine the length of carriage traverse, and to shift the tool carrier so as to reciprocally operate upon different portions of its tool carriage guides.

10. In a machine of the class described, a tool carriage slidable longitudinally thereon, a tool carrier to traverse upon said tool carriage, a shaft on said tool carriage transverse to the plane of traverse of said tool carrier and provided with gears at opposite ends thereof, a rack on said tool carrier to engage one of said gears, a rotatable cam carried by said carriage upon an axis transverse to the lathe bed and below the tool carriage, means to drive said cam from a tool carriage feed shaft, and a rack actuated by said cam to engage the other of said gears to transmit reciprocating motion from said cam to said tool carrier.

11. In a machine of the class described, a lathe bed, a carriage slidable longitudinally thereon, a pivotally mounted member carried by said tool carriage, a tool carrier mounted to traverse upon said pivotally mounted member, a shaft on said tool carriage co-axial with the center of movement of said pivotally mounted member and provided with a gear at its upper end, a rack carried by said tool carrier to engage said gear carried by said carriage upon an axis transverse to and below the lathe bed, means to drive said cam continuously in one direction from a tool carriage feed shaft, and means to transmit reciprocating motion from said cam to said tool carrier.

12. In a machine of the class described, a rigid supporting member, a tool carrier adjustable to reciprocate in any predetermined direction, an actuating shaft on said tool carriage having a gear at its upper end, a rack on said tool carrier to engage said gear to reciprocate said tool carrier, transmitting mechanism receiving positive motion in one direction to positively and intermittently reciprocate said tool carrier, and cam mechanism beneath said supporting member to actuate said transmitting mechanism.

13. In a machine of the class described, a rigid supporting member, a guide member swiveled upon said rigid member to change its guide direction and to be clamped rigidly, a tool carrier adjustable with said guide member to reciprocate in any predetermined direction, an actuating shaft on said tool carriage having a gear at its upper end, a rack on said tool carrier to engage said gear to reciprocate said tool carrier, transmitting mechanism receiving positive motion in one direction and in constant engagement with said shaft to positively and intermittently reciprocate said tool carrier, and cam mechanism to actuate said transmitting mechanism.

14. In a machine of the class described, a rigid supporting member, a guide member swiveled thereon adapted to be clamped in a predetermined direction, a tool carrier adapted to traverse upon said guide member, a shaft arranged transverse to the direction of reciprocation and extended coaxially through said guide member, a pinion upon each end of said shaft, a pair of rack parallel members each engaged with a respective pinion, and one fixed to said tool carrier, and the second movably supported and a rotative cam coöperatively connecting with said second rack member for reciprocating the same and thereby transmit its motion in coördinate ratio and direction to its corresponding rack member.

15. In a machine of the class described, a rigid supporting member a guide member swiveled thereon adapted to be clamped in a predetermined direction, a tool carrier adapted to traverse upon said guide member, a shaft arranged transverse to the direction of reciprocation and extended coaxially through said guide member, a pinion upon each end of said shaft, a pair of rack parallel members each engaged with a respective pinion, and one fixed to said tool carrier, and the second movably supported, a rotative cam coöperatively connecting with said second rack member for reciprocating the same and thereby transmit its motion in coördinate ratio and direction to its corresponding rack member, and adjusting devices in connection with said first rack member for altering the length of carrier stroke reciprocation, and manually transferably locating said carrier upon said guide member.

16. In a machine of the character described, a supporting track, a tool carriage traversable longitudinally thereon, a tool carrier adjustably mounted upon said tool carriage to move substantially transversely to said track, a rotative cam member to effect the traverse of said tool carriage upon its track, a reciprocating member supported in parallelism with said track and actuated by said cam member, and means to engage said reciprocating member and tool carriage to reciprocate said carriage upon its track.

17. In a machine of the character described, a base having longitudinal track surfaces, a tool carriage movable thereon longitudinally of said track, a tool carrier adjustably mounted upon said tool carriage to move in different predetermined directions relative to said tool carriage, a cam drum, means actuated by said cam drum to reciprocate said tool carrier in any desired direction relative to said tool carriage, a bar extending in substantial parallelism with the track surface of said bed, and actuated by said cam in motions of reciprocation, and coupling devices adjustable upon said bar member to engage said tool carriage to traverse it upon said track surface.

18. In a machine of the character described, a supporting track structure, a tool carriage slidable longiudinally thereon, a tool carrier mounted upon said tool carriage to traverse thereon substantially transversely to said track, a rotative motion converting device having a reciprocating element coextensive of said track structure, abutment members adjustable upon said reciprocating element at opposite sides of said tool carriage to engage and traverse said carriage in alternate directions, and adjusting members upon said carriage to engage with said respective abutment members to micrometrically adjust the traverse of said tool carriage.

19. In a machine of the character disclosed, a supporting track structure, a tool carriage traversable longitudinally thereon, a tool carrier adjustably mounted upon said tool carriage to move substantially transversely to said track, a reciprocating tool carriage feed member coextensive of said track, and members adjustable thereon to alternately engage and feed said tool carriage in opposite directions over any desired section of said track.

20. In a machine of the character disclosed, a track structure having a plurality of parallel tracks, a tool carriage upon each track traversable longitudinally thereon, a plurality of reciprocating tool carriage feed members, and abutment members independently adjustable in pairs upon said respective reciprocating members to provide independently adjustable feeds for the respective tool carriages.

21. In a machine of the character disclosed, a pair of independent tool carriages provided with tools to operate from opposite sides upon the work, independent reciprocating feed members to traverse said tool carriages in one direction, and abutment members independently adjustable in pairs upon said respective reciprocating members to provide independently adjustable feeds for the respective tool carriages.

22. In a machine of the character disclosed, a live spindle and tailstock to hold the work, a pair of independent tool carriages provided with tools to operate from opposite sides upon the work, a feed shaft provided with independent cams to effect the longitudinal traverse movements of said respective tool carriages, reciprocating members actuated by said respective cams, and adjustable abutment members carried in pairs by said reciprocating members to engage and feed said tool carriages.

23. In a machine of the character disclosed, plural tool carriages, independent reciprocating feding mechanisms for the respective tool carriages, and abutment members adjustable in pairs upon the respective reciprocating mechanisms to traverse said tool carriages independently of each other.

24. In a machine of the character disclosed, a live spindle to support the work, a tool carriage movable longitudinally of the work, a feed shaft, a member fixed thereon to convert rotary into reciprocating motion, a rack-bar coextensive of the work engaging with said shaft member and reciprocated thereby, and means adjustable on said rackbar to engage and traverse said tool carriage longitudinally of the work.

25. In a machine of the character disclosed, a live spindle to support the work, a tool carriage movable longitudinally of the work, a tool carrier mounted upon and movable relative to said tool carriage, a shaft, motion converting devices connected with said shaft to convert rotary into reciprocating motion having an element coextensive with the work to embrace said tool carriage and traverse the same in coördinate and subordinate stroke lengths, and means to drive said shaft at different rates of speed relative to said live spindle.

26. In a machine of the character disclosed, a live spindle to support the work, a tool carriage movable longitudinally of the work, a tool carrier mounted upon and movable relative to said tool carriage, a shaft, motion converting devices connected with said shaft to convert rotary into reciprocating motion having an element coextensive with the work to embrace said tool carriage and traverse the same in coördinate and subordinate stroke lengths, means to drive said shaft at different rates of speed relative to said live spindle, and speed changing mechanism automatically actuated to cause alternate movements of said tool carriage to be made at different rates of speed.

27. In a machine of the character disclosed, plural independently operable tool carriages having tools to respectively engage on opposite sides of the work, a feed shaft, independent motion converting devices connected with said shaft to convert rotary into reciprocating motion and having elements coextensive with the work to embrace said respective tool carriages and traverse the same respectively in coördinate or subordinate stroke lengths, means to drive said shaft at different rates of speed relative to the live spindle, and means automatically controlled to change the speed of said shaft in each cycle of movement of said tool carriages.

28. In a machine of the character disclosed, a live spindle to support the work, plural independent tool carriages movable longitudinally of the work and provided with tools to respectively engage opposite sides of the work, a feed shaft, independent mechanisms carried by said shaft to convert rotary into reciprocating motion and each having a reciprocating element coextensive with the work, means carried by said reciprocating elements to engage the respective tool carriages to traverse the same, and means to drive said feed shaft at different rates of speed relative to said live spindle.

29. In a machine of the character disclosed, a live spindle to support the work, plural independent tool carriages movable longitudinally of the work and provided with tools to respectively engage opposite sides of the work, a feed shaft, independent motion converting devices connected with said shaft to convert rotary into reciprocating motion, each having a reciprocating element coextensive with the work, means carried by said reciprocating elements to engage the respective tool carriages to traverse the same, means to drive said feed shaft at different rates of speed relative to said live spindle, and automatically actuated speed changing mechanism to cause alternate movements of said tool carriages to be made at different rates of speed.

30. In a machine of the character disclosed, a live spindle to support the work, plural tool carriages independently movable longitudinally of the work, and provided with tools to operate respectively upon different portions of the work, a feed shaft, independent mechanisms carried by said shaft to convert rotary into reciprocating motion and each having a reciprocating element, adjustable means carried by said reciprocating elements to engage said respective tool carriages to traverse the same, and means to drive said feed shaft at different rates of speed relative to said live spindle.

31. In a machine of the character described, a supporting structure having a track longitudinally thereof, a live spindle to support the work, a tool carriage movable longitudinally on said track, a tool carrier mounted upon said tool carriage and movable substantially transversely of said track, a cam rotatably mounted on said supporting structure and rotating in one direction, a reciprocating member actuated by said cam and provided with adjustable stops in pairs to engage and traverse said tool carriage along said track, a cam carried by said tool carriage and rotating in one direction, and means actuated by said cam on the tool carriage to reciprocate said tool carrier.

32. In a machine of the character described, a supporting structure having a track longitudinally thereof, a live spindle to support successive work members, a plurality of tool carriages independently movable longitudinally on said track, a tool carrier traversably mounted upon each of said tool carriages, independent cams rotatably mounted upon said supporting structure, independent reciprocating members actuated by said respective cams and provided with adjustable stops in pairs to engage and traverse said respective tool carriages, cams rotatably carried by said respective tool carriages, and means actuated by said respective cams on the tool carriages to traverse said tool carriers, said tool carriages and tool carriers acting conjointly in cycles of movement upon successive work members.

33. In a mechanism of the character described, a supporting member provided with tracks, a live spindle to rotatably support successive work members, a plurality of independent cam actuated tool carriages movable longitudinally upon said tracks, tool carriers movably mounted upon said respective tool carriages and independently cam actuated to reciprocate relative to said tool carriages, said tool carriers being armed with tools to conjointly operate in cyclic movements upon successive work members.

34. In a mechanism of the character described, a supporting member provided with a track, a live spindle to rotatably support successive work members, a tool carriage mounted to reciprocate longitudinally upon said track and cam actuated to reciprocate thereon, a tool carrier armed with one or more tools and mounted upon and movable reciprocally relative to said tool carriage and cam actuated to reciprocate thereon, said tool carriage and tool carrier serving to conjointly operate said tool in cyclic movements upon successive work members.

35. In a machine of the character disclosed, a bed member providing a longitudinal track, a carriage movable on said track, motion converting devices supported upon said bed member for converting rotary into reciprocating motion having a reciprocating component coextensive of said track for traversing the latter a predetermined distance in alternate directions, a tool supporting member independently movable upon said carriage, a motion converting device upon said carriage having a reciprocating component coextensive of the traversing limits of said tool supporting member and adapted to connect therewith to propel the same in coördinate or subordinate stroke lengths therewith, and transmission devices for both of said motion converting devices for imparting motion thereto at a relative coördinate rate of speed, whereby a cutting tool upon said supporting member may be moved longitudinally and diametric of the work.

36. In a machine of the character disclosed, a bed providing a longitudinal track, a carriage supported upon said bed and slidable upon said track, a shaft, a cam drum fixed upon said shaft having opposingly directed cam surfaces progressively arranged, a member supported in parallelism with said track and coextensive thereof, and engaged with said cam drum, and adapted to be reciprocated thereby and convey its motion in coördinate or subordinate stroke lengths to said carriage, a cam shaft, coextensive of said track, a tool supporting memmer slidably superposed upon said casing, a cam drum rotatively supported upon said carriage in driven connection with said cam shaft, throughout the length of the carriage traverse upon its track, motion imparting devices connecting with said second cam drum and adapted to be reciprocated thereby and convey motion to said tool supporting member in coördinate and subordinate stroke lengths, whereby said tool supporting member may be moved with said carriage longitudinally upon said track and simultaneously independently thereto, in the same or different directions.

37. In a machine of the character disclosed, a bed member providing opposing longitudinal tracks, a carriage supported and slidable upon each track, a tool supporting member slidably supported upon each carriage in the same and different directions, means for each carriage for independently traversing each carriage, each having a component coextensive of its relative track and movable in longitudinal motions of reciprocations and adapted to be coupled to its respective carriage to correspondingly convey its motion in coördinate and subordinate stroke lengths, and at any located traversing section of said carriage upon its track, similar traversing means upon each carriage for traversing each tool supporting member independently upon its carriage in any direction, in predetermined coördinate and relatively subordinate stroke lengths, and transmission devices common to traversing motion means whereby relatively coördinate and different traversing operations may be imparted to said carriage and tool supporting members in the same or alternate directions.

38. In a machine of the class described, a lathe bed having a pair of parallel longitudinal walls each having a track at its upper surface relatively oppositely inclined in a direction upwardly from their inner adjacent edges, and a longitudinal anchorage rail projected from the outer surface of each wall beneath a protruding portion of its respective upper track surface.

39. In a machine of the class described, a lathe bed, having a pair of walls longitudinally parallel, each having an upper track surface protruding transverse beyond the wall surfaces, and terminating in a forward and rear vertical guide surface and underlying anchorage surface, an anchorage rail projecting from the outer surface of each wall having a vertical surface and underlying anchorage surface, and a carriage slidably mounted upon said upper track having a depending apron engaging said vertical guide and anchorage surface.

40. In a lathe, a supporting member provided with a track, a live spindle and a tailstock to rotatably support successive work members, a tool carriage mounted to move longitudinally upon said track and cam actuated to reciprocate thereon at each cycle of cam movement, a tool carrier armed with one or more tools mounted traversably upon said tool carriage and cam actuated to reciprocate thereon at each cam cycle, said tool carriage and tool carrier serving to conjointly operate said tool in cyclic movements upon successive work members.

41. In a lathe, a supporting member provided with tracks, a live spindle and a tailstock to rotatably support successive work members, a plurality of independently cam actuated tool carriages movable longitudinally upon said tracks, tool carriers armed with tools movably mounted upon said respective tool carriages and independently cam actuated to reciprocate relative to said tool carriages, said tool carriages and tool carriers serving to conjointly operate said tools in cyclic movements upon successive work members.

In witness whereof, I hereunto subscribe my name, as attested by the two subscribing witnesses.

WILLIAM L. SCHELLENBACH.

Witnesses:
P. G. MARCH,
ALBERT T. WINKELMANN.